(12) United States Patent
Feng et al.

(10) Patent No.: US 11,965,860 B2
(45) Date of Patent: Apr. 23, 2024

(54) TEST SYSTEM FOR HARD ROCK BREAKING BY MICROWAVE INTELLIGENT LOADING BASED ON TRUE TRIAXIAL STRESS

(71) Applicant: Northeastern University, Shenyang (CN)

(72) Inventors: Xiating Feng, Shenyang (CN); Jiuyu Zhang, Shenyang (CN); Feng Lin, Shenyang (CN); Shiping Li, Shenyang (CN); Xiangxin Su, Shenyang (CN); Tianyang Tong, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 395 days.

(21) Appl. No.: 17/618,378

(22) PCT Filed: Dec. 8, 2020

(86) PCT No.: PCT/CN2020/134553
§ 371 (c)(1),
(2) Date: Dec. 10, 2021

(87) PCT Pub. No.: WO2022/116229
PCT Pub. Date: Jun. 9, 2022

(65) Prior Publication Data
US 2022/0412855 A1  Dec. 29, 2022

(30) Foreign Application Priority Data
Dec. 4, 2020 (CN) .......................... 202011399172.2

(51) Int. Cl.
*E21D 9/00* (2006.01)
*E21B 7/00* (2006.01)
(Continued)

(52) U.S. Cl.
CPC ............... *G01N 3/068* (2013.01); *G01N 3/12* (2013.01); *G01N 3/60* (2013.01); *G01N 22/02* (2013.01);
(Continued)

(58) Field of Classification Search
CPC .... E21B 7/00; E21D 9/00; E21D 9/08; E21D 9/087; G01N 3/068; G01N 3/12;
(Continued)

(56) References Cited

U.S. PATENT DOCUMENTS

2016/0116388 A1   4/2016  Chen et al.

FOREIGN PATENT DOCUMENTS

| CN | 106596281 B | 4/2017 |
| CN | 106761796 A | 5/2017 |

(Continued)

OTHER PUBLICATIONS

Machine Translation of WO 2021203453 A1 (Year: 2021).*
Machine Translation of CN 107290224 A (Year: 2017).*
Machine Translation of CN 107490517 A (Year: 2017).*

*Primary Examiner* — Nguyen Q. Ha
(74) *Attorney, Agent, or Firm* — MUNCY, GEISSLER, OLDS & LOWE, P.C.

(57) ABSTRACT

Provided is a test system for hard rock breaking by a microwave intelligent loading based on true triaxial stress, including: a true triaxial stress loading device consisting of a loading frame and a rock sample moving structure; a microwave-induced hard rock breaking device consisting of an excitation cavity, a rectangular waveguide, a magnetron, a thermocouple, a circulator, a cold water circulation device, a flowmeter, a power meter, an automatic impedance tuner, a coupler, a microwave heater and a shielding cavity; and a dynamic rock response monitoring and intelligent microwave parameter control system consisting of a CCD indus-
(Continued)

trial camera, a temperature acquisition device and an anti-electromagnetic high-temperature resistant acoustic wave-acoustic emission integrated sensor. According to the test system, the microwave-induced hard rock breaking test, dynamic monitoring temperature and rock breaking in microwave-induced breaking process and intelligent control over microwave power and heating time are achieved.

10 Claims, 7 Drawing Sheets

(51) Int. Cl.
    *G01N 3/06*       (2006.01)
    *G01N 3/12*       (2006.01)
    *G01N 3/60*       (2006.01)
    *G01N 22/02*     (2006.01)

(52) U.S. Cl.
    CPC ........... *G01N 2203/0019* (2013.01); *G01N 2203/0048* (2013.01); *G01N 2203/0057* (2013.01); *G01N 2203/0067* (2013.01); *G01N 2203/06* (2013.01); *G01N 2203/0647* (2013.01); *G01N 2203/0658* (2013.01)

(58) Field of Classification Search
    CPC .. G01N 3/60; G01N 22/02; G01N 2203/0019; G01N 2203/0048; G01N 2203/0057; G01N 2203/06; G01N 2203/0647; G01N 2203/0658
    See application file for complete search history.

(56) References Cited

FOREIGN PATENT DOCUMENTS

| | | | | |
|---|---|---|---|---|
| CN | 107290224 A | * | 10/2017 | ............... G01N 3/12 |
| CN | 107290226 A | | 10/2017 | |
| CN | 107490517 A | * | 12/2017 | ............... G01N 3/12 |
| CN | 108678761 A | | 10/2018 | |
| CN | 108801799 A | | 11/2018 | |
| WO | WO-2021203453 A1 | * | 10/2021 | ............. E21B 47/00 |

* cited by examiner

TEST SYSTEM FOR HARD ROCK BREAKING BY MICROWAVE INTELLIGENT LOADING BASED ON TRUE TRIAXIAL STRESS

BACKGROUND OF THE INVENTION

1. Field of the Invention

The invention relates to the technical field of rock mechanical experimental devices, in particular to a test system for hard rock breaking by a microwave intelligent loading based on true triaxial stress.

2. The Prior Arts

In hard rock engineering of mining, traffic tunnels, hydropower plants, diversion tunnels, oil drilling, and the like, a mechanical method for rock breaking (TBM, tunnel boring machines and deep well drilling rigs) often has the problems that cutting or drilling is hard to implement, and tools or drill bits are worn seriously; the construction cost is increased, and the construction schedule is delayed; and the application of the mechanical method for rock breaking to the above engineering is restricted. The engineering practice shows that, when hard rocks are dug by the TBM, the check, maintenance and replacement of the tools account for ⅓ of the total construction time or so, and the cost of the tools also accounts for ⅓ of the total construction cost or so. Microwave-assisted mechanical rock breaking is considered as a new rock breaking technology with good application prospects, and widely concerned by scholars at home and abroad. The hard rocks are pretreated by microwaves, and therefore the mechanical properties, such as uniaxial strength, tensile strength and fracture toughness, of rock masses are reduced; then, the rocks are broken by the mechanical method; and thus, the rock breaking efficiency can be improved, and the rock breaking cost is reduced. The previous studies are all conducted in an unstressed state, while engineering rock masses are mostly in a three-dimensional unequal stress state; complicated stress adjustment should be made in the excavation process, and three-dimensional stress can affect the strength and deformation features of the rock masses significantly; and thus, the features and mechanism of microwave-induced breaking rock masses under true triaxial stress need to be studied.

A strong electromagnetic field can be generated during microwave-induced breaking of hard rocks, which easily results in output signal distortion of electric sensors or breakdown and burn-out of electronic elements, and temperature rise, breaking process and breaking degree in the microwave-induced breaking process of the hard rocks are hard to obtain; the microwave-induced rock breaking effect is difficult to evaluate; and rock thermal response and breaking process dynamic monitoring in a strong microwave field need to be developed. In engineering application, when the rocks are broken with constant microwave power in a heating time state, the microwave-induced rock breaking degree is insufficient or excessive, and consequently the breaking efficiency is not high or microwave energy is wasted; the rock temperature rise, breaking degree and breaking development trend need to be urgently related to microwave power and heating time, and intelligent dynamic control over the microwave power and heating time is achieved; and the microwave energy utilization rate and breaking efficiency are improved.

SUMMARY OF THE INVENTION

In order to solve the technical problems in the prior art, the invention provides a test system for hard rock breaking by a microwave intelligent loading based on true triaxial stress. According to the test system, the microwave-induced hard rock breaking test under true triaxial stress and microwave protection in the microwave radiation process can be achieved, and intelligent control over microwave power and heating time is achieved.

To achieve the purpose, the invention adopts the following technical scheme:

A test system for hard rock breaking by a microwave intelligent loading based on true triaxial stress comprises a true triaxial microwave-induced hard rock breaking device, a dynamic rock response monitoring and intelligent microwave parameter control system, a controller and a computer, and a true triaxial microwave-induced hard rock breaking device comprises a true triaxial stress loading device and a microwave-induced hard rock breaking device;

The true triaxial stress loading device comprises a loading frame and a rock sample moving structure arranged in the loading frame, wherein the loading frame comprises an upper horizontal frame, a lower horizontal frame, a left vertical frame, a right vertical frame and a transverse frame arranged above the lower horizontal frame; the transverse frame comprises a front loading plate and a rear loading plate which are connected through four pull rods, and a sample loading platform is arranged on a side surface of the lower horizontal frame; a Y-direction load jack is mounted below the upper horizontal frame, and used for bearing a counteracting force in a Y direction; an X-direction load jack is mounted on one side, close to a rock sample, of the left vertical frame, and used for bearing a counteracting force in a X direction; a Z-direction load jack is mounted on the rear loading plate, and used for bearing a counteracting force in a Z direction; a space among the top of the lower horizontal frame, the X-direction load jack, the Y-direction load jack and the Z-direction load jack forms a triaxial pressure cavity used for containing the rock sample;

The microwave-induced hard rock breaking device comprises an excitation cavity, a rectangular waveguide, a magnetron, a thermocouple, a circulator, a cold water circulation device, a flowmeter, a power meter, an automatic impedance tuner, a coupler, a microwave heater and a shielding cavity, wherein one end of the rectangular waveguide is connected with the excitation cavity, and the other end of the rectangular waveguide is connected with the microwave heater; the circulator, the coupler and the automatic impedance tuner are arranged on the rectangular waveguide sequentially; the magnetron is mounted in the excitation cavity, and connected with a microwave power supply; the magnetron is further connected with the cold water circulation device and the flowmeter sequentially, and the flowmeter is used for monitoring and displaying a cold water flow; the circulator is connected with a water load and the thermocouple sequentially, and the thermocouple is used for monitoring and displaying a temperature of the water load; the coupler is connected with the power meter and the automatic impedance tuner separately; the shielding cavity is arranged at an exterior of the rectangular waveguide, connected with the front loading plate fixedly, and used for shielding an electromagnetic energy absorbed by the rock sample;

The dynamic rock response monitoring and intelligent microwave parameter control system comprises a CCD industrial camera, a temperature acquisition device and an anti-electromagnetic high-temperature resistant acoustic wave-acoustic emission integrated sensor, wherein the CCD industrial camera is used for recording images in the microwave-induced breaking process in real time, and transmitting the images to the computer for saving and displaying; the temperature acquisition device is used for acquiring the rock real-time temperature and transmitting the acquired temperature to the computer for saving and displaying; the anti-electromagnetic high-temperature resistant acoustic wave-acoustic emission integrated sensor is connected with an acoustic emission instrument, and is used for monitoring rock real-time wave velocity and acoustic emission, and transmitting the rock real-time wave velocity and the acoustic emission to the computer through the acoustic emission instrument for saving and displaying; an embedded program of the computer is used for computing wave velocity drop, acoustic emission cumulative number and acoustic emission rate according to the rock real-time wave velocity and the acoustic emission, and sending the rock real-time temperature, the wave velocity drop, the acoustic emission cumulative number and the acoustic emission rate to the controller; and the controller is used for adjusting a microwave power and a microwave heating time according to the wave velocity drop, the rock real-time temperature, the acoustic emission cumulative number and the acoustic emission rate.

The rock sample moving structure comprises a movable cantilever crane, a Z-direction advancing jack and an X-direction advancing jack, wherein the movable cantilever crane is connected to a top of the upper horizontal frame, and used for hoisting or hoisting away the rock sample from the sample loading platform; the Z-direction advancing jack is arranged above the sample loading platform, and used for pushing the rock sample onto or moving away the rock sample from a side surface of the right vertical frame; the X-direction advancing jack is arranged in the right vertical frame, and used for pushing the rock sample into or removing the rock sample on the side surface of the right vertical frame from the triaxial pressure cavity.

Further, three pressure sensors are respectively mounted on side walls of oil cylinders of the X-direction load jack, the Y-direction load jack and the Z-direction load jack, and the three pressure sensor are respectively connected with the computer, and used for transmitting pressure data to the computer for saving and displaying.

A rectangular hole is formed in a middle of the front loading plate, and a length and a width of the rectangular hole are larger than those of a front surface of the rock sample separately, so that the microwave radiating surface of the rock sample is not in contact with the front loading plate absolutely.

Further, the rectangular waveguide penetrates through the shielding cavity, and is connected with the shielding cavity through an aluminum foil tape and a soft metal net.

Further, the microwave heater is a microwave surface heater or a microwave in-hole heater.

Further, the temperature acquisition device is an infrared thermal imager mounted in front of the rock sample or a distributed high temperature optical fiber mounted on the hole wall of the rock sample; the infrared thermal imager is used for acquiring real-time temperature of a surface of the rock sample, and transmitting the acquired temperature to the computer for saving and displaying; the distributed high temperature optical fiber is connected with a demodulator, and is used for acquiring the real-time temperature of the hole wall of the rock sample, and a real-time temperature of the hole wall of the rock sample is transmitted to the computer for saving and displaying after being demodulated through the demodulator.

Further, the infrared thermal imager and the CCD industrial camera are arranged in a shielding box separately, and the shielding box is connected with a cutoff circular waveguide extending into the shielding cavity.

Further, the anti-electromagnetic high-temperature resistant acoustic wave-acoustic emission integrated sensor comprises a piezoelectric element, a metal casing packaged at the exterior of the piezoelectric element, and a polytetrafluoroethylene heat insulation sleeve wrapping the exterior of the metal casing; the front end of the metal casing is connected with a quartzose waveguide rod, and the quartzose waveguide rod is in direct contact with a surface of the rock sample; and the piezoelectric element is connected with a shielding wire.

Further, the specific process of adjusting the microwave power and the microwave heating time by the dynamic rock response monitoring and intelligent microwave parameter control system comprises the following steps:

Firstly, enabling the computer to presetting the microwave initial power, microwave initial heating time, rock initial wave velocity and wave velocity drop threshold through the embedded program, and transmitting the parameters to the controller; setting the acoustic emission cumulative threshold, acoustic emission rate threshold, rock critical breaking point temperature, stable crack growth starting point temperature, unstable crack growth starting point temperature, heating time of unstable crack growth starting point, and unstable crack growth time in the controller; enabling the controller to control the microwave power supply to break the rock sample with the preset microwave initial power and microwave initial heating time;

Secondly, in the rock breaking process, enabling the anti-electromagnetic high-temperature resistant acoustic wave-acoustic emission integrated sensor to monitor rock real-time wave velocity and the acoustic emission, and sending the rock real-time wave velocity and the acoustic emission to the computer; besides, enabling the temperature acquisition device to acquire rock real-time temperature, and transmit the acquired temperature to the computer;

Finally, enabling the computer to subtract the rock real-time wave velocity from the rock initial wave velocity through the embedded program to obtain the wave velocity drop, and accumulate the acquired acoustic emission count to obtain the acoustic emission cumulative number; computing the acoustic emission count acquired within is to obtain the acoustic emission rate, and enabling the computer to transmit the rock real-time temperature, wave velocity drop, acoustic emission cumulative number and acoustic emission rate to the controller; enabling the controller to compare the wave velocity drop with the preset wave velocity drop threshold; if the wave velocity drop is larger than or equal to the wave velocity drop threshold, enabling the controller to control the microwave power supply to stop heating so as to avoid excessive breaking; if the wave velocity drop is smaller than the wave velocity drop threshold, enabling the controller to compare the rock real-time temperature, the acoustic emission cumulative number and the acoustic emission rate with the rock critical breaking point temperature, the stable crack growth starting point temperature, the unstable crack growth starting point temperature, the acoustic emission cumulative threshold and the acoustic emission rate threshold which are set in the controller as follows:

If the rock temperature is lower than the rock critical breaking point temperature, enabling the controller to control the microwave power supply to hold the microwave initial power and the microwave initial heating time for rock breaking;

If the rock temperature is higher than or equal to the rock critical breaking point temperature, and smaller than the stable crack growth starting point temperature, judging the relation between the acoustic emission cumulative number and the acoustic emission cumulative threshold; if the emission cumulative number is smaller than the acoustic emission cumulative threshold, it shows that the microwave initial power is insufficient, enabling the controller to control the microwave power supply to increase the microwave power for rock breaking; if the emission cumulative number is higher than or equal to the emission cumulative threshold, it shows that the microwave initial power is sufficient, enabling the controller to control the microwave power supply to hold the microwave initial power for continuous rock breaking;

If the rock temperature is higher than or equal to the stable crack growth starting point temperature, and smaller than the unstable crack growth starting point temperature, judging the relation between the acoustic emission rate and the acoustic emission rate threshold; if the acoustic emission rate is smaller than the acoustic emission rate threshold, it shows that the microwave initial power is insufficient, enabling the controller to control the microwave power supply to increase the microwave power for rock breaking; if the acoustic emission rate is larger than or equal to the acoustic emission rate threshold, it shows that the microwave initial power is sufficient, enabling the controller to control the microwave power supply to hold the microwave initial power for continuous rock breaking;

If the rock temperature is higher than or equal to the unstable crack growth starting point temperature, judging the relation between the acoustic emission rate and the acoustic emission rate threshold; if the acoustic emission rate is smaller than the acoustic emission rate threshold, it shows that the microwave initial power is insufficient, enabling the controller to control the microwave power supply to increase the microwave power for rock breaking; if the acoustic emission rate is larger than or equal to the acoustic emission rate threshold, it shows that the microwave initial power is sufficient, enabling the controller to control the microwave power supply to hold the microwave initial power for continuous rock breaking; besides, judging the relation between the microwave initial heating time and the heating time of the unstable crack growth starting point; if the microwave initial heating time is larger than or equal to the heating time of the unstable crack growth starting point, enabling the controller to control the microwave power supply to prolong the microwave heating time; if the microwave initial heating time is larger than the heating time of the unstable crack growth starting point, computing the difference between the microwave initial heating time and the heating time of the unstable crack growth starting point; if the difference between the microwave initial heating time and the heating time of the unstable crack growth starting point is smaller than or equal to the unstable crack growth time, enabling the controller to control the microwave power supply to prolong the microwave heating time; if the microwave initial heating time is larger than the heating time of the unstable crack growth starting point, computing the difference between the microwave initial heating time and the heating time of the unstable crack growth starting point; and if the difference between the microwave initial heating time and the heating time of the unstable crack growth starting point is larger than the unstable crack growth time, enabling the controller to control the microwave power supply to shorten the microwave heating time.

The test system has the beneficial effects:

1) The microwave-induced hard rock breaking test under true triaxial stress can be achieved, and the loading mode of five-surface compression and single-surface suspension (front surface) can be achieved through a true triaxial stress loading device, and the test system is used for simulating the stress state that the rock masses on the excavation face are located;

2) A cold water circulation device, a thermocouple, a circulator, a flowmeter, a power meter, an automatic impedance tuner and a shielding cavity are adopted for microwave protection in the microwave loading process, and therefore, safe and stable operation of a microwave-induced hard rock breaking device is ensured;

3) The monitoring of temperature, hard rock breaking evolution and hard rock breaking degree in the microwave heating process and intelligent control over the microwave power and microwave heating time are achieved through a dynamic rock response monitoring and intelligent microwave parameter control system, and the technical problems that insufficient or excessive microwave-induced rock breaking easily occurs in engineering application and consequently the breaking efficiency is not high or the energy is wasted are solved; and 4) The monitoring of the rock temperature, wave velocity, acoustic emission and images in the microwave-induced breaking process can be achieved through the dynamic rock response monitoring and intelligent microwave parameter control system, so as to provide data for subsequent evaluation of the microwave-induced hard rock breaking effect, and research on breaking rules and mechanism.

Other characteristics and advantages of the test system provided by the invention are partially described in the following embodiments in detail.

The reference signs in the drawings of the description comprises:

1: movable cantilever crane; 2: upper horizontal frame; 3: Y-direction load jack; 4: Y-direction displacement sensor; 5: Z-direction displacement sensor; 6: pull rod; 7: Z-direction load jack; 8: rear loading plate; 9: Z-direction pressure sensor; 10: sample loading platform; 11: lower horizontal frame; 12: rock sample; 13: shielding cavity; 14: microwave surface heater; 15: rectangular waveguide; 16: front loading plate; 17: Y-direction pressure sensor; 18: automatic impedance tuner; 19: power meter; 20: coupler; 21: circulator; 22: water load; 23: magnetron; 24: excitation cavity; 25: cold water circulation device; 26: flowmeter; 27: thermocouple; 28: lifting platform; 29: left vertical frame; 30: X-direction load jack; 31: piston pressure head; 32: triaxial pressure cavity; 33: rigid pressing plate; 34: movable pressing block; 35: right vertical frame; 36: X-direction advancing jack; 37: Z-direction advancing jack; 38: transverse frame; 39: X-direction displacement sensor; 40: X-direction pressure sensor; 41: rock sample loading route; 42: rock sample unloading route; 43: CCD industrial camera; 44: shielding box; 45: infrared thermal imager; 46: anti-electromagnetic high-temperature resistant acoustic wave-acoustic emission integrated sensor; 47: acoustic emission instrument; 48: demodulator; 49: computer; 50: distributed high temperature optical fiber; 51: microwave in-hole heater; 52: mounting pressing plate; 53: quartzose waveguide rod; 54: piezoelectric element; 55: polytetrafluoroethylene heat insulation sleeve; 56: metal casing; 57: connector; 58: shielding wire.

DETAILED DESCRIPTION OF THE PREFERRED EMBODIMENT

The technical solutions in embodiments of the invention will be clearly and fully described below in connection with the accompanying drawings in embodiments of the invention, and it will be apparent that the described embodiments are only some but not all embodiments of the invention.

In the description of the invention, it should be understood that orientation or position relationships indicated by terms "longitudinal", "horizontal", "vertical", "upper", "lower", "front", "rear", "left", "right", "upright", "level", "top", "bottom", "inside", "outside", and the like. are orientation or position relationships as shown in the drawings, and these terms are just used to facilitate description of the invention and simplify the description, but not to indicate or imply that the mentioned device or elements must have a specific orientation and must be established and operated in a specific orientation, and thus, these terms cannot be understood as a limitation to the invention.

In the description of the invention, it should be noted that, unless otherwise specified and limited, meanings of terms "mount", "connected with", and "connected to" should be understood in a board sense. For example, the connection may be a mechanical connection or an electrical connection, may be intercommunication between two components, or may be a direct connection or an indirect connection by using an intermediate medium. The specific meanings about the terms in the invention may be understood by those of ordinary skilled in the art according to specific circumstances.

Figure 1:
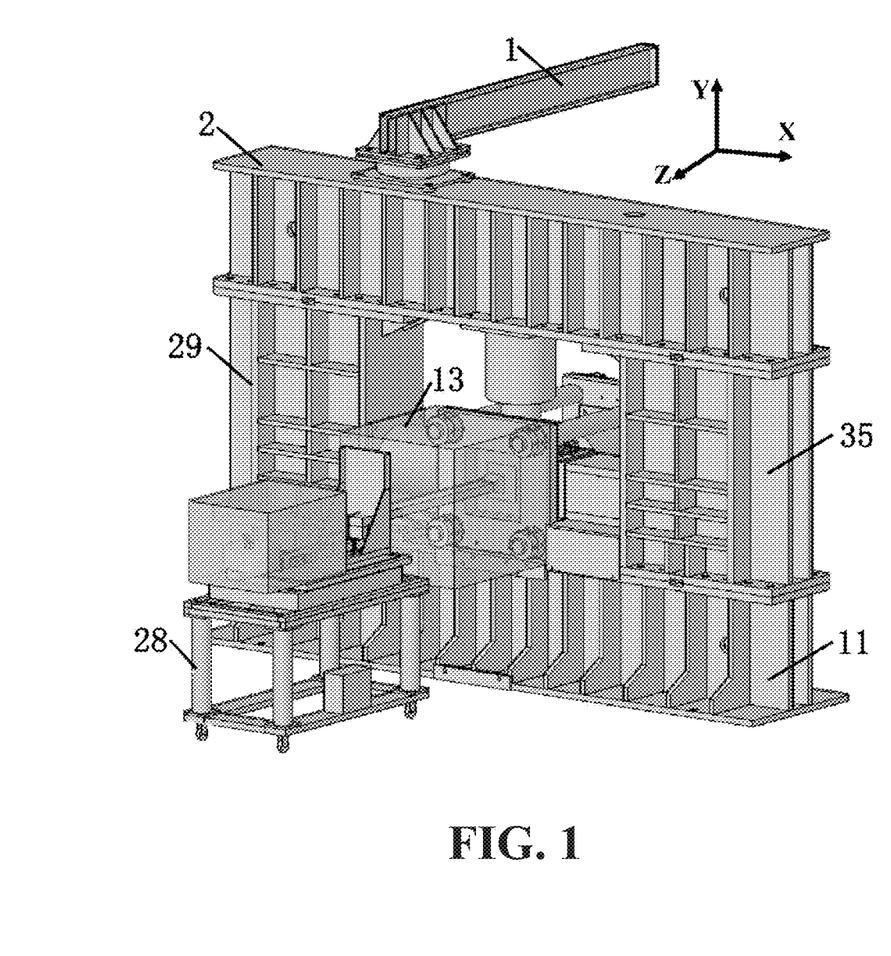
FIG. 1 is a stereo view I of a test system for hard rock breaking by a microwave intelligent loading based on true triaxial stress provided by the embodiment of the invention.
Figure 2:
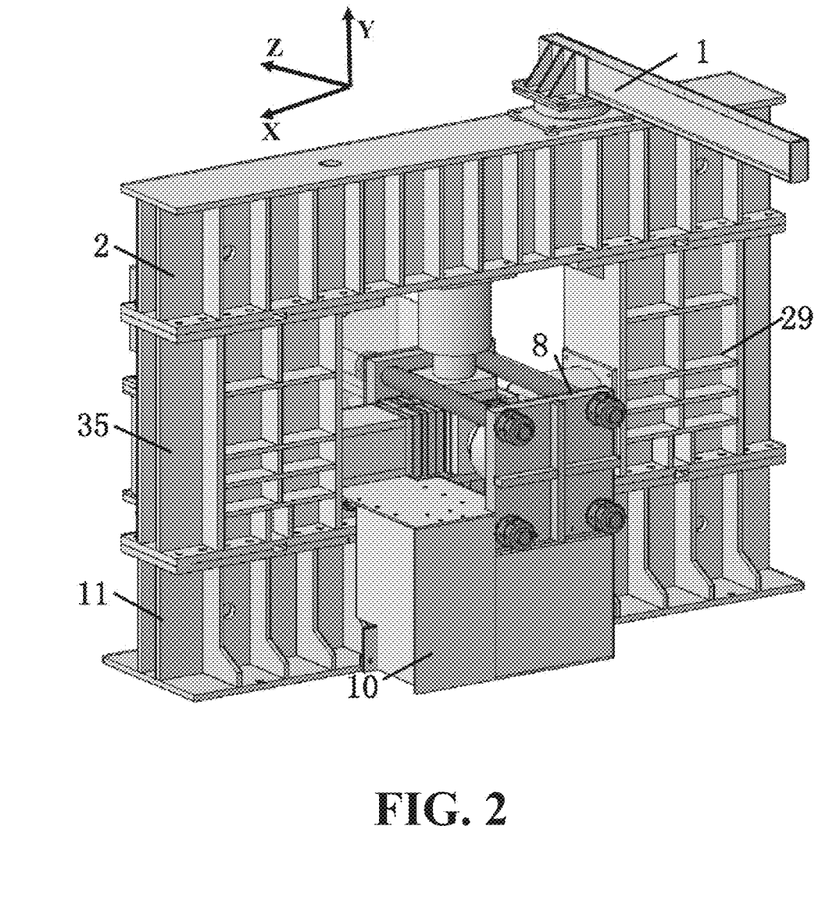
FIG. 2 is a stereo view II of the test system for hard rock breaking by a microwave intelligent loading based on true triaxial stress provided by the embodiment of the invention.
Figure 3:
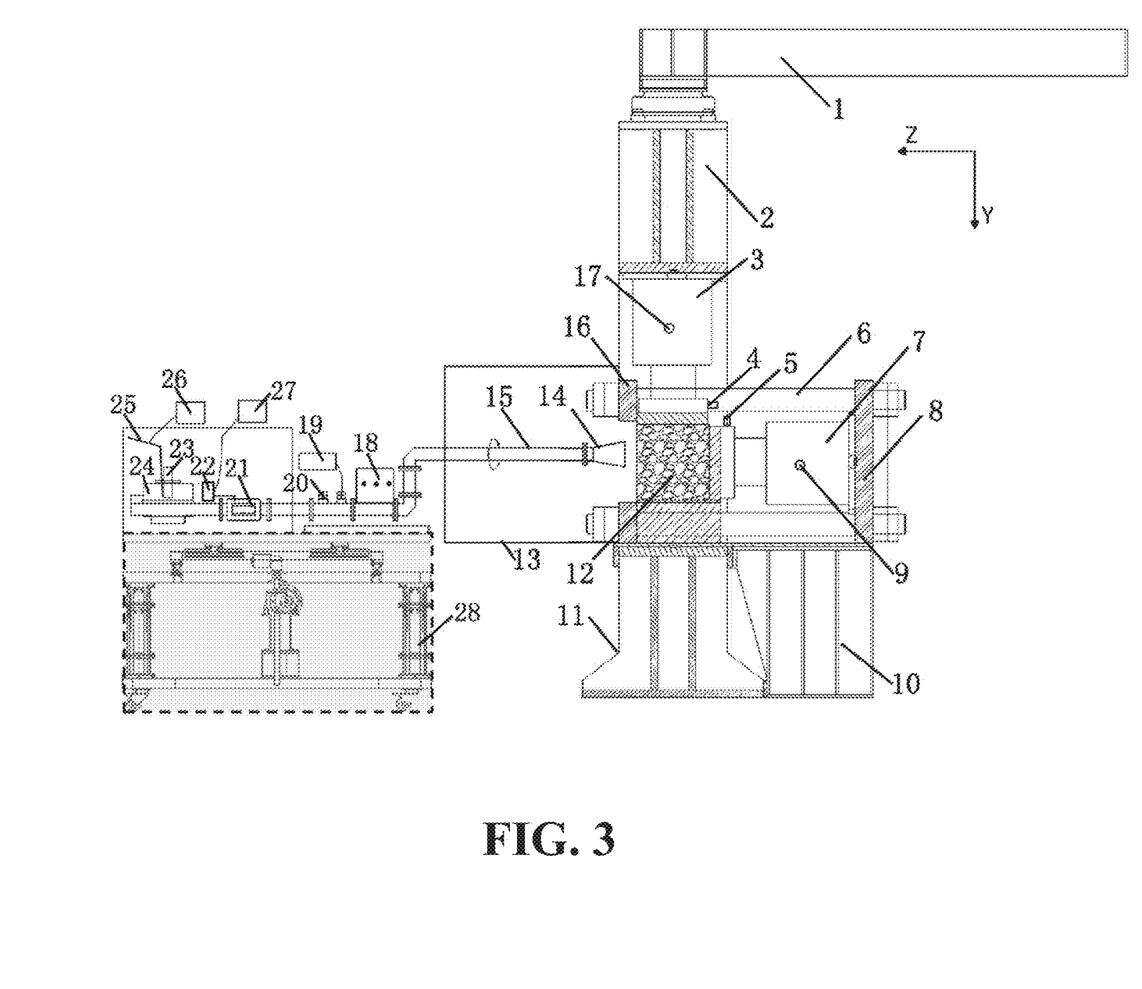
FIG. 3 is a side view of the test system for hard rock breaking by a microwave intelligent loading based on true triaxial stress provided by the embodiment of the invention.
Figure 5:
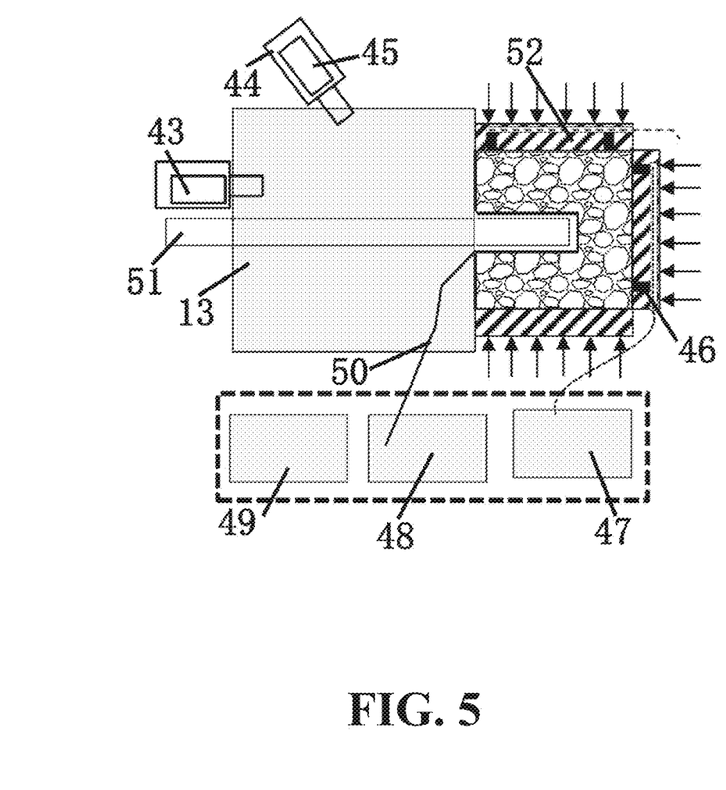
FIG. 5 is a structure diagram of a rock response dynamic monitoring system in a strong microwave field provided by the embodiment of the invention.

In order to solve the problems in the prior art, as shown in FIG. 1-FIG. 7, the invention provides a test system for hard rock breaking by a microwave intelligent loading based on true triaxial stress. The test system comprises a true triaxial microwave-induced hard rock breaking device, a dynamic rock response monitoring and intelligent microwave parameter control system, a controller (not shown in the drawings) and a computer 49, and the true triaxial microwave-induced hard rock breaking device comprises a true triaxial stress loading device and a microwave-induced hard rock breaking device;

The true triaxial stress loading device comprises a loading frame and a rock sample moving structure arranged in the loading frame, wherein the loading frame comprises an upper horizontal frame 2, a lower horizontal frame 11, a left vertical frame 29, a right vertical frame 35 and a transverse frame 38 arranged above the lower horizontal frame 11; the transverse frame 38 comprises a front loading plate 16 and a rear loading plate 8 which are connected through four pull rods 6, and a sample loading platform 10 is arranged on the side surface of the lower horizontal frame 11; a Y-direction load jack 3 is mounted below the upper horizontal frame 2, and used for bearing counteracting force in the Y direction; an X-direction load jack 30 is mounted on one side, close to rock sample 12, of the left vertical frame 29, and used for bearing counteracting force in the X direction; a Z-direction load jack 7 is mounted on the rear loading plate 8, and used for bearing counteracting force in the Z direction; a space among the top of the lower horizontal frame 11, the X-direction load jack 30, the Y-direction load jack 3 and the Z-direction load jack 7 forms a triaxial pressure cavity 32 used for containing the rock sample 12;

The microwave-induced hard rock breaking device comprises an excitation cavity 24, a rectangular waveguide 15, a magnetron 23, a thermocouple 27, a circulator 21, a cold water circulation device 25, a flowmeter 26, a power meter 19, an automatic impedance tuner, a coupler 20, a microwave heater and a shielding cavity 13, wherein one end of the rectangular waveguide 15 is connected with the excitation cavity 24, and the other end of the rectangular waveguide 15 is connected with the microwave heater; the circulator 21, the coupler 20 and the automatic impedance tuner 18 are arranged on the rectangular waveguide 15 sequentially; the magnetron 23 is mounted in the excitation cavity 24, and connected with a microwave power supply; the magnetron 23 is further connected with the cold water circulation device 25 and the flowmeter 26 sequentially, and the flowmeter 26 is used for monitoring and displaying cold water flow; the circulator 21 is connected with a water load 22 and the thermocouple 27 sequentially, and the thermocouple 27 is used for monitoring and displaying the temperature of the water load 22; the coupler 20 is connected with the power meter 19 and the automatic impedance tuner 18 separately; the shielding cavity 13 is arranged at the exterior of the rectangular waveguide 15, connected with the front loading plate 16 fixedly, and used for shielding electromagnetic energy absorbed by the rock sample 12;

The dynamic rock response monitoring and intelligent microwave parameter control system comprises a CCD industrial camera 43, a temperature acquisition device and an anti-electromagnetic high-temperature resistant acoustic wave-acoustic emission integrated sensor 46 which are mounted on the rock sample 12, wherein the CCD industrial camera 43 is used for recording images in the microwave-induced breaking process in real time, and transmitting the images to the computer 49 for saving and displaying; the temperature acquisition device is used for acquiring the rock real-time temperature and transmitting the acquired temperature to the computer 49 for saving and displaying; the anti-electromagnetic high-temperature resistant acoustic wave-acoustic emission integrated sensor 46 is connected with an acoustic emission instrument 47, and the anti-electromagnetic high-temperature resistant acoustic wave-acoustic emission integrated sensor 46 is used for monitoring the rock real-time wave velocity and acoustic emission and transmitting the rock real-time wave velocity and the acoustic emission to the computer 49 through the acoustic emission instrument 47 for saving and displaying; the embedded program of the computer 49 is used for computing the wave velocity drop, acoustic emission cumulative number and acoustic emission rate according to the rock real-time wave velocity and the acoustic emission, and transmitting the rock real-time temperature, wave velocity drop, acoustic emission cumulative number and acoustic emission rate to the controller; and the controller is used for adjusting the microwave power and microwave heating time are adjusted according to the wave velocity drop, rock real-time temperature, acoustic emission cumulative number and acoustic emission rate.

As shown in FIG. 1-FIG. 3, the microwave-induced hard rock breaking device is arranged on a lifting platform 28, and therefore, the microwave-induced hard rock breaking device can be moved front and back, right and left, and up and down; and the prior art is adopted for the lifting platform 28. The loading frame is used for providing the counteracting force to three-dimensional stress, and the tops and bottoms of the left vertical frame 29 and the right vertical frame 35 of the loading fame are connected with the upper horizontal frame 2 and the lower horizontal frame 11 by bolts separately. The X-direction load jack 30, the Y-direction load jack 3 and the Z-direction load jack 7 are controlled through servo control systems separately, and the prior art is adopted for the servo control systems; and the servo control systems are connected with the computer 49, and respective loading and unloading of loads in three directions are achieved by the computer 49 through the servo control systems. During stress loading of the Z-direction load jack 7, the stress balance of the rock sample 12 is guaranteed through friction force born by the rock sample 12 in the X direction and the Y direction; for example, when the friction coefficients of the rock sample 12 in the X direction and the Y direction are smaller than 0.5, loading is performed through the X-direction load jack 30 and the Y-direction load jack 3 firstly, and then the Z-direction load is applied through the Z-direction load jack 7, so that the friction force in the X direction and the Y direction is larger than the Z-direction load all the time; when the friction coefficients of the rock sample 12 in the X direction and the Y direction are larger than or equal to 0.5, the loading is performed at the same loading rate through the X-direction load jack 30, the Y-direction load jack 3 and the Z-direction load jack 7 at the same time; during unloading of the three-dimensional stress, the Z-direction load needs to be removed firstly, and then the X-direction and Y-direction loads are removed gradually. The true triaxial stress loading device of the test system is applicable for the cubic rock sample 12 with the maximum side length of 40 cm, and the test of different rock samples 12 is achieved through change of the dimensions of a rigid pressing plate 33.

In the test system, electric power is provided to the magnetron 23 through the microwave power supply, and the electric energy is converted into electromagnetic energy through the magnetron 23; electromagnetic waves are generated by the magnetron 23 in the excitation cavity 24, transmitted along the rectangular waveguide 15, pass through the circulator 21, the coupler 20 and the automatic impedance tuner 18 sequentially, and finally are radiated to the rock sample 12 (surface or interior of a hole) through the microwave heater (a microwave surface heater 14 or a microwave in-hole heater 51). The prior art is adopted for the automatic impedance tuner 18, and the load impedance of the rock sample 12 can be automatically detected through the automatic impedance tuner; the impedance of the microwave-induced breaking device is adjusted in time, and maximum matching with the load impedance of the rock sample 12 is achieved to reduce the microwave reflection power. The shielding cavity 13 is a closed metal box, is an intermediate connecting piece between the true triaxial stress loading device and the microwave-induced hard rock breaking device, and is connected with the front loading plate 16 fixedly, and used for shielding the electromagnetic energy unabsorbed by the rock sample 12, and the electromagnetic waves are limited in the shielding cavity 13.

The rock sample moving structure 12 comprises a movable cantilever crane 1, a Z-direction advancing jack 37 and an X-direction advancing jack 36; the movable cantilever crane 1 is connected with the top of the upper horizontal frame 2, and used for hoisting or hoisting away the rock sample 12 from the sample loading platform 10; the Z-direction advancing jack 37 is arranged above the sample loading platform 10, and used for pushing the rock sample 12 onto or moving away the rock sample from the side surface of the right vertical frame 35; the X-direction advancing jack 36 is arranged in the right vertical frame 35, and used for pushing the rock sample 12 into or removing the rock sample on the side surface of the right vertical frame 35 from the triaxial pressure cavity 32.

Figure 4:
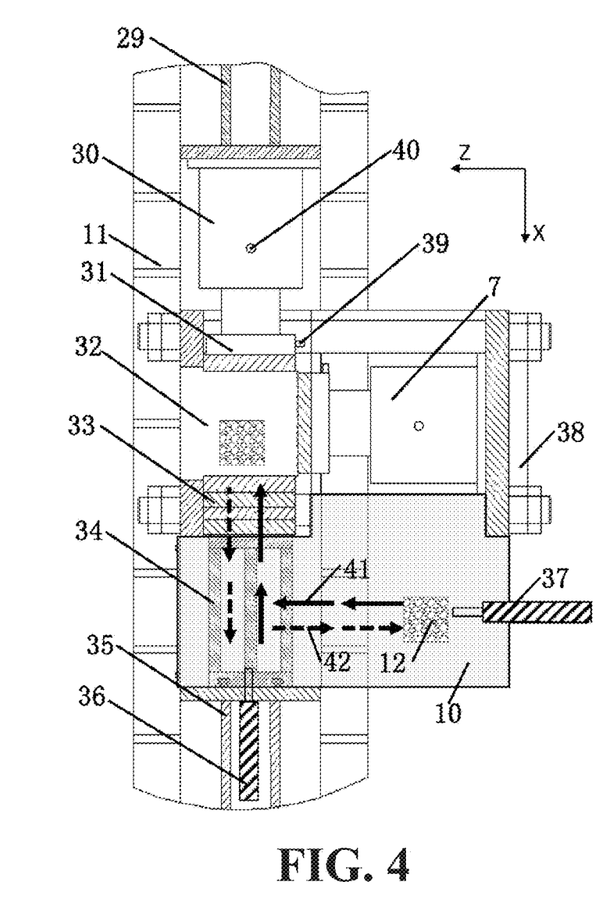
FIG. 4 is a section view of a true triaxial stress loading device provided by the embodiment of the invention.

In the test system, the prior art is adopted for the movable cantilever crane 1, and guide rails and movable pressing blocks 34 capable of moving along the guide rails up and down are arranged on one side, close to the rock sample 12, of the right vertical frame 35; a rock sample loading route 41 and a rock sample unloading route 42 are shown in FIG. 4, and during loading of the rock sample 12, the movable pressing blocks 34 are moved upwards along the guide rails and fixed; the rock sample 12 is hoisted onto the sample loading platform 10 through the movable cantilever crane 1, and then the rock sample 12 is pushed into the triaxial pressure cavity 32 through the Z-direction advancing jack 37 and the X-direction advancing jack 36; the movable pressing blocks 34 are moved downwards onto the sample loading platform 10 along the guide rails as the passive end of the X-direction stress; the rigid pressing plate 33 is arranged between the movable pressing blocks 34 and the rock sample 12; in practical application, the X-direction advancing jack 36 and the Z-direction advancing jack 37 are controlled by the controller to operate; during unloading of the rock sample 12, the movable pressing blocks 34 are moved upwards along the guide rails and fixed, and the rock sample 12 is moved out in the X direction through the X-direction advancing jack 36, and the moved out in the Z direction through the Z-direction advancing jack 37; and finally the rock sample 12 is hoisted away from the sample loading platform 10 through the movable cantilever crane 1.

Pressure sensors are respectively mounted on the side walls of oil cylinders of the X-direction load jack 30, the Y-direction load jack 3 and the Z-direction load jack 7, and an X-direction pressure sensor 40, a Y-direction pressure sensor 17 and a Z-direction pressure sensor 9 are respectively connected with the computer 49, so that pressure data is transmitted to the computer 49 for saving and displaying, and the three pressure sensors are used for monitoring the pressure of the oil cylinders of the X-direction load jack 30, the Y-direction load jack 3 and the Z-direction load jack 7 separately; the loads applied to the rock sample 12 by the load jacks are obtained according to the pressure of the oil cylinders separately; displacement sensors are respectively mounted on piston pressure heads 31 of the X-direction load jack 30, the Y-direction load jack 3 and the Z-direction load jack 7, and an X-direction displacement sensor 39, a Y-direction displacement sensor 4 and a Z-direction displacement sensor 5 are respectively connected with the computer 49, and used for transmitting displacement data to the computer 49; the three displacement sensors are respectively used for monitoring movement of pistons of the X-direction load jack 30, the Y-direction load jack 3 and the Z-direction load jack 7, and the displacement of the rock sample 12 in each direction is obtained through the movement of the piston of each load jack; the real-time pressure data of the three jacks is compared with respective set pressure through the computer 49, and the real-time displacement data of the three jacks is compared with respective set displacements; the X-direction load jack 30, the Y-direction load jack 3 and the Z-direction load jack 7 are respectively controlled by the servo control systems to achieve independent loading and unloading in the three directions.

A rectangular hole is formed in the middle of the front loading plate 16, and the length and width of the rectangular hole are larger than those of the front surface of the rock sample 12 separately, so that the microwave radiating surface of the rock sample 12 (namely the front surface of the rock sample 12) is not in contact with the front loading plate 16 absolutely.

The rectangular waveguide 15 penetrates through the shielding cavity 13, and is connected with the shielding cavity 13 through an aluminum foil tape and a soft metal net to prevent the electromagnetic waves from leaking from the connection position between the rectangular waveguide and the shielding cavity; in actual test, the blank angle of the rock sample 12, the position between the rock sample 12 and loading components as well as gaps among the loading components adopt the aluminum tape, the soft metal net and magnetic elements, or are filled, sealed and fixed with the aluminum foil tape, the soft metal net and the magnetic elements to prevent the electromagnetic waves from leaking from the gaps, and coupling between microwave radiation and true triaxial stress loading is achieved.

The microwave heater is a microwave surface heater 14 or a microwave in-hole heater 51, and the microwave heater is used for directionally radiating the microwave energy; the rocks can be broken on the surface through the microwave surface heater 14 to assist in mechanical breaking of the hard rocks; and the hard rocks can be broken in boreholes through the microwave in-hole heater 51 to reduce rock burst risks.

The temperature acquisition device is an infrared thermal imager 45 mounted in front of the rock sample 12 or a distributed high temperature optical fiber 50 mounted on the hole wall of the rock sample 12; the infrared thermal imager 45 is used for acquiring real-time temperature of the rock surface, and transmitting the acquired temperature to the computer 49 for saving and displaying; the distributed high temperature optical fiber 50 is connected with a demodulator 48, and is used for acquiring the real-time temperature of the rock hole wall, and real-time temperature of the rock hole wall is transmitted to the computer 49 for saving and displaying after being demodulated through the demodulator 48.

The infrared thermal imager 45 and the CCD industrial camera 43 are arranged in a shielding box 44 separately, and the shielding box 44 is connected with a cutoff circular waveguide extending into the shielding cavity 13. Specifically, the shielding box 44 is a closed metal box connected with the cutoff circular waveguide, and the cutoff circular waveguide connected with the shielding box 44 can be used for shielding the electromagnetic waves, and can also be used as an observation port for information monitoring; the cutoff circular waveguide is connected with the shielding cavity 13 through aluminum foil paper; during microwave-induced breaking on the surface, the real-time temperature of the rock surface can be acquired through the infrared thermal imager 45 mounted in the shielding box 44; and the rock breaking process can be monitored through the CCD industrial camera 43 mounted in the shielding box 44.

As shown in FIG. 5, the computer 49 is connected with the CCD industrial camera 43, the temperature acquisition device, the acoustic emission instrument 47 and the controller separately, and the controller is connected with the microwave power supply; if the temperature acquisition device is the infrared thermal imager 45, the computer 49 is connected with the infrared thermal imager 45; and if the temperature acquisition device is the distributed high temperature optical fiber 50, the computer 49 is connected with the demodulator 48. The CCD industrial camera 43 is mounted right opposite to the rock sample 12, and is used for monitoring the rock breaking process; images in the microwave-induced breaking process are recorded through the CCD industrial camera 43 in real time, and in subsequent processing, the images in the microwave-induced breaking process are analyzed with a two-dimensional digital speckle technology to obtain rock deformation rules. During microwave-induced breaking of the hard rocks in holes, the infrared thermal imager 45 is mounted on the front surface or the side surface the rock sample 12, and the rock surface temperature is monitored in real time; or a distributed optical fiber temperature measurement technology is adopted, namely that the temperature is measured through the distributed high temperature optical fiber 50 in the shielding cavity 13 and the demodulator 48 at the exterior of the shielding cavity 13; one end of the distributed high temperature optical fiber 50 is fixed to the hole wall of the rock sample 12, and the other end of the distributed high temperature optical fiber 50 is connected with the demodulator 48; the demodulator 48 is connected with the computer 49, and is free of influence of the strong electromagnetic field; and during monitoring of the hole wall temperature of the rock sample 12, the distributed high temperature optical fiber 50 is fixed in the hole of the rock sample 12 with a high-temperature adhesive tape in a multi-point mode, to ensure that the distributed high temperature optical fiber is in tight contact with the hole wall of the rock sample 12. During microwave-induced breaking of the hard rocks, the strong electromagnetic field and high temperature are generated on the rock surface, and the strong electromagnetic field and high temperature can interfere with acquisition of the wave velocity and acoustic emission greatly; and interference of the strong electromagnetic field and high temperature can be avoided by adopting the anti-electromagnetic high-temperature resistant acoustic wave-acoustic emission integrated sensor 46, and therefore the rock wave velocity and acoustic emission activity are acquired.

Figure 6:
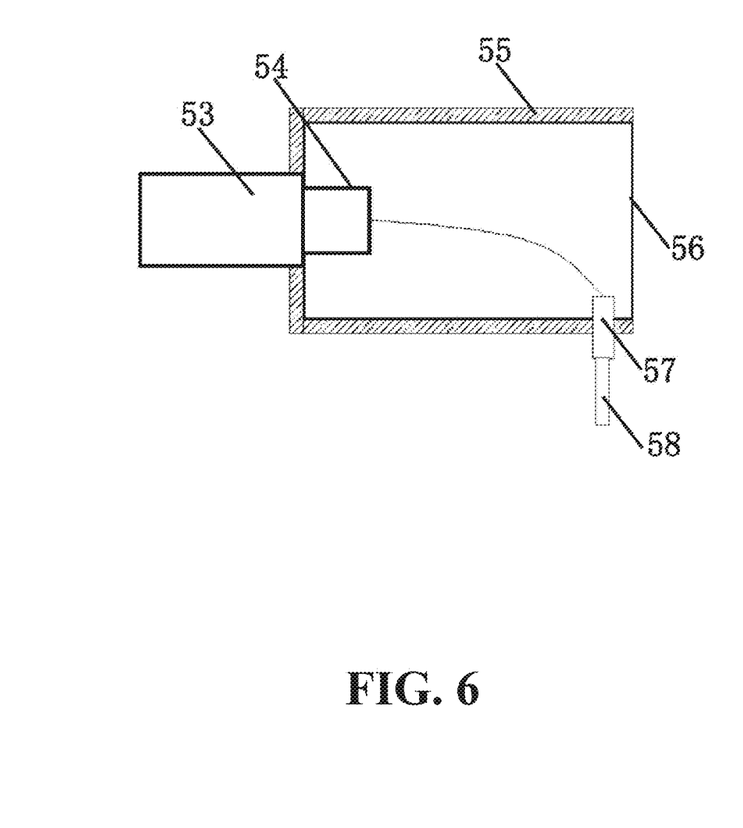
FIG. 6 is a structure diagram of an anti-electromagnetic high-temperature resistant acoustic wave-acoustic emission integrated sensor provided by the embodiment of the invention.

The anti-electromagnetic high-temperature resistant acoustic wave-acoustic emission integrated sensor 46 comprises a piezoelectric element 54, a metal casing 56 packaged at the exterior of the piezoelectric element 54, and a polytetrafluoroethylene heat insulation sleeve 55 wrapping the exterior of the metal casing 56; the front end of the metal casing 56 is connected with a quartzose waveguide rod 53, and the quartzose waveguide rod 53 is in direct contact with the surface of the rock sample 12; and the piezoelectric element 54 is connected with a shielding wire 58. As shown in FIG. 6, the piezoelectric element 54 is packaged with the metal casing 56, and the exterior of the metal casing is wrapped with the polytetrafluoroethylene heat insulation sleeve 55, so that the interference of the strong electromagnetic field and high temperature can be shielded; the quartzose waveguide rod 53 connected with the front end of the metal casing 56 is in direct contact with the surface of the rock sample 12, and can be resistant to 400 DEG C. maximally; the shielding wire 58 is connected with the acoustic emission instrument 47, and a connector 57 is arranged at the external part, penetrating through the metal casing 56 and the polytetrafluoroethylene heat insulation sleeve 55, of the shielding wire 58, and the connector 57 is used for protecting the shielding wire 58. In actual test, the anti-electromagnetic high-temperature resistant acoustic wave-acoustic emission integrated sensor 46 is arranged on the surface of the rock sample 12 through mounting pressing plates 52, and except for the front surface and the bottom surface, the rest four surfaces of the rock sample 12 are each provided with the mounting pressing plate 52 which is in direct contact with the surface of the rock sample 12; each mounting pressing plate 52 is provided with a leading wire slot and a through hole, and the leading wire slot is located on one side, far away from the rock sample 12, of the corresponding mounting pressing plate 52, namely that the leading wire slot is not close to the surface of the rock sample 12; and the anti-electromagnetic high-temperature resistant acoustic wave-acoustic emission integrated sensor 46 is arranged in the through hole. In actual test, at least one rigid pressing plate 33 (unfixed) is further arranged on one side, far away from the rock sample 12, of each mounting pressing plate 52.

Figure 7:
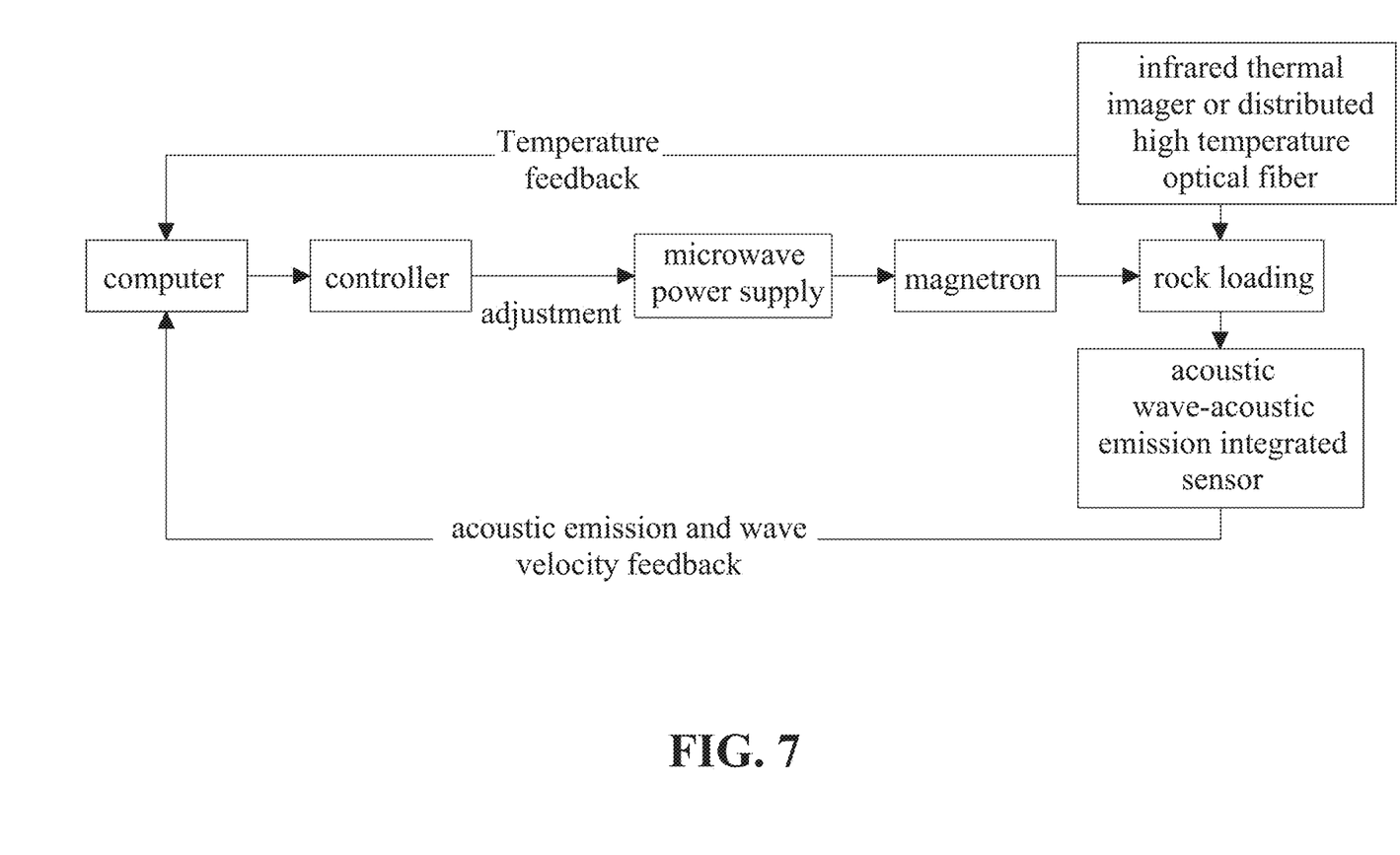
FIG. 7 is a schematic diagram of the specific process of adjusting microwave power and microwave heating time by a dynamic rock response monitoring and intelligent microwave parameter control system provided by the embodiment of the invention.

As shown in FIG. 7, the specific process of adjusting the microwave power and microwave heating time by the dynamic rock response monitoring and intelligent microwave parameter control system comprises the following steps:

Firstly, enabling the computer 49 to preset the microwave initial power, microwave initial heating time, rock initial wave velocity and wave velocity drop threshold through the embedded program, and transmitting the parameters to the controller; setting the acoustic emission cumulative threshold, acoustic emission rate threshold, rock critical breaking point temperature, stable crack growth starting point temperature, unstable crack growth starting point temperature, heating time of unstable crack growth starting point, and unstable crack growth time in the controller; enabling the controller to control the microwave power supply to break the rock with the preset microwave initial power and microwave initial heating time;

Secondly, in the rock breaking process, enabling the anti-electromagnetic high-temperature resistant acoustic wave-acoustic emission integrated sensor 46 to monitor rock real-time wave velocity and the acoustic emission, and sending the rock real-time wave velocity and the acoustic emission to the computer 49; besides, enabling the temperature acquisition device to acquire rock real-time temperature, and transmit the acquired temperature to the computer 49;

Finally, enabling the computer 49 to subtract the rock real-time wave velocity from the rock initial wave velocity through the embedded program to obtain the wave velocity drop, and accumulate the acquired acoustic emission count to obtain the acoustic emission cumulative number; computing the acoustic emission count acquired within is to obtain the acoustic emission rate, and enabling the computer 49 to transmit the rock real-time temperature, wave velocity drop, acoustic emission cumulative number and acoustic emission rate to the controller; enabling the controller to compare the wave velocity drop with the preset wave velocity drop threshold; if the wave velocity drop is larger than or equal to the wave velocity drop threshold, enabling the controller to control the microwave power supply to stop heating so as to avoid excessive breaking; if the wave velocity drop is smaller than the wave velocity drop threshold, enabling the controller to compare the rock real-time temperature, the acoustic emission cumulative number and the acoustic emission rate with the rock critical breaking point temperature, the stable crack growth starting point temperature, the unstable crack growth starting point temperature, the acoustic emission cumulative threshold and the acoustic emission rate threshold which are set in the controller as follows:

If the rock temperature is lower than the rock critical breaking point temperature, enabling the controller to control the microwave power supply to hold the microwave initial power and the microwave initial heating time for rock breaking;

If the rock temperature is higher than or equal to the rock critical breaking point temperature, and smaller than the stable crack growth starting point temperature, judging the relation between the acoustic emission cumulative number and the acoustic emission cumulative threshold; if the emission cumulative number is smaller than the acoustic emission cumulative threshold, it shows that the microwave initial power is insufficient, enabling the controller to control the microwave power supply to increase the microwave power for rock breaking; if the emission cumulative number is higher than or equal to the emission cumulative threshold, it shows that the microwave initial power is sufficient, enabling the controller to control the microwave power supply to hold the microwave initial power for continuous rock breaking;

If the rock temperature is higher than or equal to the stable crack growth starting point temperature, and smaller than the unstable crack growth starting point temperature, judging the relation between the acoustic emission rate and the acoustic emission rate threshold; if the acoustic emission rate is smaller than the acoustic emission rate threshold, it shows that the microwave initial power is insufficient, enabling the controller to control the microwave power supply to increase the microwave power for rock breaking; if the acoustic emission rate is larger than or equal to the acoustic emission rate threshold, it shows that the microwave initial power is sufficient, enabling the controller to control the microwave power supply to hold the microwave initial power for continuous rock breaking;

If the rock temperature is higher than or equal to the unstable crack growth starting point temperature, judge the relation between the acoustic emission rate and the acoustic emission rate threshold; if the acoustic emission rate is smaller than the acoustic emission rate threshold, it shows that the microwave initial power is insufficient, and the microwave power supply is controlled by the controller to increase the microwave power for rock breaking; if the acoustic emission rate is larger than or equal to the acoustic emission rate threshold, it shows that the microwave initial power is sufficient, the microwave power supply is controlled by the controller to hold the microwave initial power for continuous rock breaking; meanwhile, judge the relation between the microwave initial heating time and the heating time of the unstable crack growth starting point; if the microwave initial heating time is larger than or equal to the heating time of the unstable crack growth starting point, the microwave power supply is controlled by the controller to prolong the microwave heating time; if the microwave initial heating time is larger than the heating time of the unstable crack growth starting point, compute the difference between the microwave initial heating time and the heating time of the unstable crack growth starting point; if the difference between the microwave initial heating time and the heating time of the unstable crack growth starting point is smaller than or equal to the unstable crack growth time (0-60 s), the microwave power supply is controlled by the controller to prolong the microwave heating time; if the microwave initial heating time is larger than the heating time of the unstable crack growth starting point, compute the difference between the microwave initial heating time and the heating time of the unstable crack growth starting point; and if the difference between the microwave initial heating time and the heating time of the unstable crack growth starting point is larger than the unstable crack growth time (0-60 s), the microwave power supply is controlled by the controller to shorten the microwave heating time.

In the test system, in order to obtain the rock critical breaking point temperature, stable crack growth starting point temperature, unstable crack growth starting point temperature, heating time of unstable crack growth starting point, and unstable crack growth time, acoustic emission cumulative threshold and acoustic emission rate threshold, a large number of microwave-induced breaking test needs to be taken in advance to obtain the relation diagram between the rock real-time temperature and the acoustic emission cumulative number, the relation diagram between the rock real-time temperature and the acoustic emission rate, the relation diagram between the rock real-time temperature and the microwave power and microwave heating time; and the rock critical breaking point temperature, the stable crack growth starting point temperature, the unstable crack growth starting point temperature, the heating time of the unstable crack growth starting point, and the unstable crack growth time, the acoustic emission cumulative threshold and the acoustic emission rate threshold can be obtained according to the above relation diagrams.

In the test system, the temperature in the microwave-induced breaking process and the rock breaking process can be monitored in real time through the dynamic rock response monitoring and intelligent microwave parameter control system to provide the data for subsequent evaluation of the microwave-induced rock breaking effect. The wave velocity drop and acoustic emission occur during rock breaking, and the dynamic rock response monitoring and intelligent microwave parameter control system actively controls the microwave power and microwave heating time according to dynamic feedback of the temperature and acoustic emission; for example, heating stops in case of excessive breaking, and the microwave power increases in case of insufficient breaking; and hard rock breaking by a microwave intelligent loading, applicable to construction sites and indoor test, is achieved, and the microwave-induced hard rock breaking efficiency and the microwave energy utilization rate are improved. The microwave-induced breaking degree is related to the microwave power and the microwave heating time, and the rock breaking process can be described through the acoustic emission and temperature; the wave velocity drop is a feedback index of the rock breaking degree, and used for evaluating the microwave-induced rock breaking effect; the acoustic emission cumulative number and the acoustic emission rate are the feedback indexes of rock breaking development, and the rock real-time temperature monitored by the infrared thermal imager 45 or the distributed high temperature optical fiber 50 can be used for studying the rock temperature rise characteristics; and the rock breaking conditions are determined according to the temperature, and therefore, the rock breaking trend and stage are judged according to the temperature and acoustic emission in the test system.

Although the embodiments of the invention have been illustrated and described, it should be understood that those of ordinary skilled in the art may make various changes, modifications, replacements and variations to the above embodiments without departing from the principle and spirit of the invention, and the scope of the invention is limited by the claims and their legal equivalents.

What is claimed is:

1. A test system for hard rock breaking by a microwave intelligent loading based on true triaxial stress, comprising: a true triaxial microwave-induced hard rock breaking device, a dynamic rock response monitoring and intelligent microwave parameter control system, a controller and a computer, wherein a true triaxial microwave-induced hard rock breaking device comprises a true triaxial stress loading device and a microwave-induced hard rock breaking device;

wherein the true triaxial stress loading device comprises a loading frame and a rock sample moving structure arranged in the loading frame, wherein the loading frame comprises an upper horizontal frame, a lower horizontal frame, a left vertical frame, a right vertical frame and a transverse frame arranged above the lower horizontal frame; the transverse frame comprises a front loading plate and a rear loading plate which are connected through four pull rods, and a sample loading platform is arranged on a side surface of the lower horizontal frame; a Y-direction load jack is mounted below the upper horizontal frame, and used for bearing a counteracting force in a Y direction; an X-direction load jack is mounted on one side, close to a rock sample, of the left vertical frame, and used for bearing a counteracting force in a X direction; a Z-direction load jack is mounted on the rear loading plate, and used for bearing a counteracting force in a Z direction; a space among a top of the lower horizontal frame, the X-direction load jack, the Y-direction load jack and the Z-direction load jack forms a triaxial pressure cavity used for containing the rock sample;

wherein the microwave-induced hard rock breaking device comprises an excitation cavity, a rectangular waveguide, a magnetron, a thermocouple, a circulator, a cold water circulation device, a flowmeter, a power meter, an automatic impedance tuner, a coupler, a microwave heater and a shielding cavity, wherein one end of the rectangular waveguide is connected with the excitation cavity, and the other end of the rectangular waveguide is connected with the microwave heater; the circulator, the coupler and the automatic impedance tuner are arranged on the rectangular waveguide sequentially; the magnetron is mounted in the excitation cavity, and connected with a microwave power supply; the magnetron is further connected with the cold water circulation device and the flowmeter sequentially, and the flowmeter is used for monitoring and displaying a cold water flow; the circulator is connected with a water load and the thermocouple sequentially, and the thermocouple is used for monitoring and displaying a temperature of the water load; the coupler is connected with the power meter and the automatic impedance tuner separately; the shielding cavity is arranged at an exterior of the rectangular waveguide, connected with the front loading plate fixedly, and used for shielding an electromagnetic energy absorbed by the rock sample;

wherein the dynamic rock response monitoring and intelligent microwave parameter control system comprises a CCD industrial camera, a temperature acquisition device and an anti-electromagnetic high-temperature resistant acoustic wave-acoustic emission integrated sensor, wherein the CCD industrial camera is used for recording images in the microwave-induced breaking process in real time, and transmitting the images to the computer for saving and displaying; the temperature acquisition device is used for acquiring the rock real-time temperature and transmitting the acquired temperature to the computer for saving and displaying; the anti-electromagnetic high-temperature resistant acoustic wave-acoustic emission integrated sensor is connected with an acoustic emission instrument, and is used for monitoring rock real-time wave velocity and acoustic emission, and transmitting the rock real-time wave velocity and the acoustic emission to the computer through the acoustic emission instrument for saving and displaying; an embedded program of the computer is used for computing wave velocity drop, acoustic emission cumulative number and acoustic emission rate according to the rock real-time wave velocity and the acoustic emission, and sending the rock real-time temperature, the wave velocity drop, the acoustic emission cumulative number and the acoustic emission rate to the controller; and the controller is used for adjusting a microwave power and a microwave heating time according to the wave velocity drop, the rock real-time temperature, the acoustic emission cumulative number and the acoustic emission rate.

2. The test system according to claim 1, wherein the rock sample moving structure comprises a movable cantilever crane, a Z-direction advancing jack and an X-direction advancing jack, wherein the movable cantilever crane is connected to a top of the upper horizontal frame, and used for hoisting or hoisting away the rock sample from the sample loading platform; the Z-direction advancing jack is arranged above the sample loading platform, and used for pushing the rock sample onto or moving away the rock sample from a side surface of the right vertical frame; the X-direction advancing jack is arranged in the right vertical frame, and used for pushing the rock sample into or removing the rock sample on the side surface of the right vertical frame from the triaxial pressure cavity.

3. The test system according to claim 1, wherein three pressure sensors are respectively mounted on side walls of oil cylinders of the X-direction load jack, the Y-direction load jack and the Z-direction load jack, and the three pressure sensor are respectively connected with the computer, and used for transmitting pressure data to the computer for saving and displaying.

4. The test system according to claim 1, wherein a rectangular hole is formed in a middle of the front loading plate, and a length and a width of the rectangular hole are larger than those of a front surface of the rock sample separately, so that the microwave radiating surface of the rock sample is not in contact with the front loading plate absolutely.

5. The test system according to claim 1, wherein the rectangular waveguide penetrates through the shielding cavity, and is connected with the shielding cavity through an aluminum foil tape and a soft metal net.

6. The test system according to claim 1, wherein the microwave heater is a microwave surface heater or a microwave in-hole heater.

7. The test system according to claim 1, wherein the temperature acquisition device is an infrared thermal imager mounted in front of the rock sample or a distributed high temperature optical fiber mounted on a hole wall of the rock sample; the infrared thermal imager is used for acquiring real-time temperature of a surface of the rock sample, and transmitting the acquired temperature to the computer for saving and displaying; the distributed high temperature optical fiber is connected with a demodulator, and is used for acquiring the real-time temperature of the hole wall of the rock sample, and a real-time temperature of the hole wall of the rock sample is transmitted to the computer for saving and displaying after being demodulated through the demodulator.

8. The test system according to claim 7, wherein the infrared thermal imager and the CCD industrial camera are arranged in a shielding box separately, and the shielding box is connected with a cutoff circular waveguide extending into the shielding cavity.

9. The test system according to claim 1, wherein the anti-electromagnetic high-temperature resistant acoustic wave-acoustic emission integrated sensor comprises a piezoelectric element, a metal casing packaged at the exterior of the piezoelectric element, and a polytetrafluoroethylene sleeve wrapping the exterior of the metal casing; the front end of the metal casing is connected with a quartzose waveguide rod, and the quartzose waveguide rod is in direct contact with a surface of the rock sample; and the piezoelectric element is connected with a shielding wire.

10. The test system according to claim 1, wherein a specific process of adjusting the microwave power and the microwave heating time by the dynamic rock response monitoring and intelligent microwave parameter control system comprises the following steps:

firstly, enabling the computer to presetting the microwave initial power, microwave initial heating time, rock initial wave velocity and wave velocity drop threshold through the embedded program, and transmitting the parameters to the controller; setting the acoustic emission cumulative threshold, acoustic emission rate threshold, rock critical breaking point temperature, stable crack growth starting point temperature, unstable crack growth starting point temperature, heating time of unstable crack growth starting point, and unstable crack growth time in the controller; enabling the controller to control the microwave power supply to break the rock sample with the preset microwave initial power and microwave initial heating time;

secondly, in the rock breaking process, enabling the anti-electromagnetic high-temperature resistant acoustic wave-acoustic emission integrated sensor to monitor rock real-time wave velocity and the acoustic emission, and sending the rock real-time wave velocity and the acoustic emission to the computer; besides, enabling the temperature acquisition device to acquire rock real-time temperature, and transmit the acquired temperature to the computer;

finally, enabling the computer to subtract the rock real-time wave velocity from the rock initial wave velocity through the embedded program to obtain the wave velocity drop, and accumulate the acquired acoustic emission count to obtain the acoustic emission cumulative number; computing the acoustic emission count acquired within is to obtain the acoustic emission rate, and enabling the computer to transmit the rock real-time temperature, wave velocity drop, acoustic emission cumulative number and acoustic emission rate to the controller; enabling the controller to compare the wave velocity drop with the preset wave velocity drop threshold; if the wave velocity drop is larger than or equal to the wave velocity drop threshold, enabling the controller to control the microwave power supply to stop heating so as to avoid excessive breaking; if the wave velocity drop is smaller than the wave velocity drop threshold, enabling the controller to compare the rock real-time temperature, the acoustic emission cumulative number and the acoustic emission rate with the rock critical breaking point temperature, the stable crack growth starting point temperature, the unstable crack growth starting point temperature, the acoustic emission cumulative threshold and the acoustic emission rate threshold which are set in the controller as follows:

wherein if the rock temperature is lower than the rock critical breaking point temperature, enabling the controller to control the microwave power supply to hold the microwave initial power and the microwave initial heating time for rock breaking;

wherein if the rock temperature is higher than or equal to the rock critical breaking point temperature, and smaller than the stable crack growth starting point temperature, judging the relation between the acoustic emission cumulative number and the acoustic emission cumulative threshold; if the emission cumulative number is smaller than the acoustic emission cumulative threshold, it shows that the microwave initial power is insufficient, enabling the controller to control the microwave power supply to increase the microwave power for rock breaking; if the emission cumulative number is higher than or equal to the emission cumulative threshold, it shows that the microwave initial power is sufficient, enabling the controller to control the microwave power supply to hold the microwave initial power for continuous rock breaking;

wherein if the rock temperature is higher than or equal to the stable crack growth starting point temperature, and smaller than the unstable crack growth starting point temperature, judging the relation between the acoustic emission rate and the acoustic emission rate threshold; if the acoustic emission rate is smaller than the acoustic emission rate threshold, it shows that the microwave initial power is insufficient, enabling the controller to control the microwave power supply to increase the microwave power for rock breaking; if the acoustic emission rate is larger than or equal to the acoustic emission rate threshold, it shows that the microwave initial power is sufficient, enabling the controller to control the microwave power supply to hold the microwave initial power for continuous rock breaking;

wherein if the rock temperature is higher than or equal to the unstable crack growth starting point temperature, judging the relation between the acoustic emission rate and the acoustic emission rate threshold; if the acoustic emission rate is smaller than the acoustic emission rate threshold, it shows that the microwave initial power is insufficient, enabling the controller to control the microwave power supply to increase the microwave power for rock breaking; if the acoustic emission rate is larger than or equal to the acoustic emission rate threshold, it shows that the microwave initial power is sufficient, enabling the controller to control the microwave power supply to hold the microwave initial power for continuous rock breaking; besides, judging the relation between the microwave initial heating time and the heating time of the unstable crack growth starting point; if the microwave initial heating time is larger than or equal to the heating time of the unstable crack growth starting point, enabling the controller to control the microwave power supply to prolong the microwave heating time; if the microwave initial heating time is larger than the heating time of the unstable crack growth starting point, computing the difference between the microwave initial heating time and the heating time of the unstable crack growth starting point; if the difference between the microwave initial heating time and the heating time of the unstable crack growth starting point is smaller than or equal to the unstable crack growth time, enabling the controller to control the microwave power supply to prolong the microwave heating time; if the microwave initial heating time is larger than the heating time of the unstable crack growth starting point, computing the difference between the microwave initial heating time and the heating time of the unstable crack growth starting point; and if the difference between the microwave initial heating time and the heating time of the unstable crack growth starting point is larger than the unstable crack growth time, enabling the controller to control the microwave power supply to shorten the microwave heating time.

* * * * *